July 10, 1934.    Y. AKIYOSHI    1,965,788
TABLE AND MIRROR FOR AUTOMOBILES, AIRPLANES, AND THE LIKE
Filed Nov. 15, 1932    2 Sheets-Sheet 1

INVENTOR.
Yutaka Akiyoshi
BY
G. Ward Kemp
ATTORNEY.

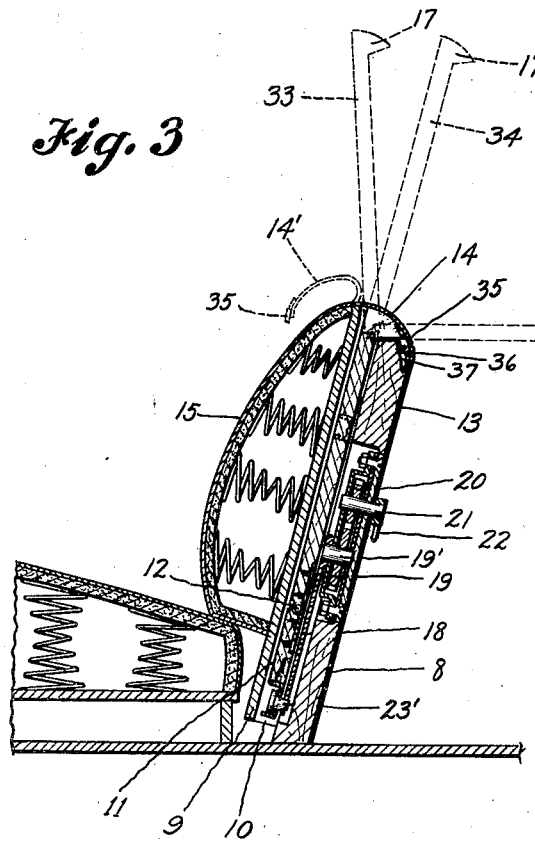
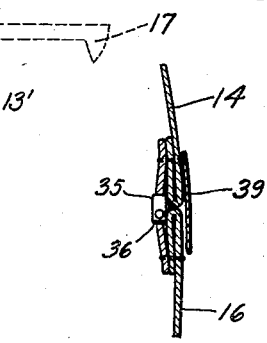
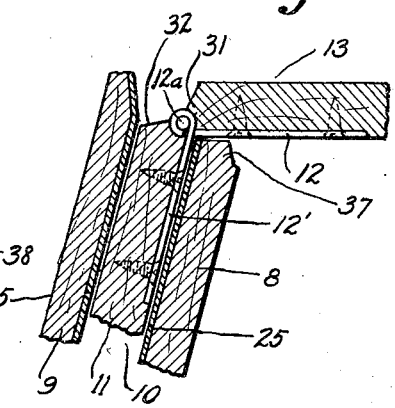
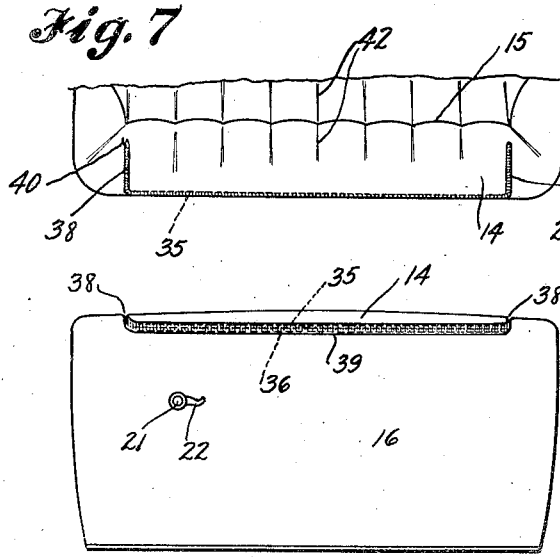

Patented July 10, 1934

1,965,788

UNITED STATES PATENT OFFICE

1,965,788

TABLE AND MIRROR FOR AUTOMOBILES, AIRPLANES, AND THE LIKE

Yutaka Akiyoshi, Eatonville, Wash.

Application November 15, 1932, Serial No. 642,706

2 Claims. (Cl. 155—123)

This invention relates to tables and mirrors for use in automobiles, airplanes and the like.

One of the objects of the invention is to provide a table and mirror in combination with the front seat of an automobile, whereby the rear portion of the tonneau of such automobile may be quickly converted into a private dressing room or the table may be used in any ordinary way as for playing cards thereon, or for lunching.

Another object is to provide a well in the rear portion of the front seat of such auto, with a table slidably positioned in the well, and normally concealed by upholstery, the table adapted to be upraised and remain on its edge above the seat to close the intervening space to the ceiling, together with a mirror affixed in the bottom of the table, whereby persons on the back seat may be aided in dressing when the table is elevated; the table being especially hinged to be turned back to horizontal position for use as any ordinary table.

A further object is to provide such a table adjustably connected to such front seat, with a holding board hinged to one edge thereof, the board slidably mounted in such well, and the hinge connection permitting the table when upraised to be tipped forward or backward for adjusting the face of the mirror to a suitable angle for light and reflection of the user; such hinges to permit such table to be turned backward parallel with the floor and there remain while the holding board and well are on obtuse angle therewith, with means for raising and lowering the table.

With these and other objects as may be hereinafter described, I have illustrated my invention by the accompanying drawings, in which:—

Figure 2:
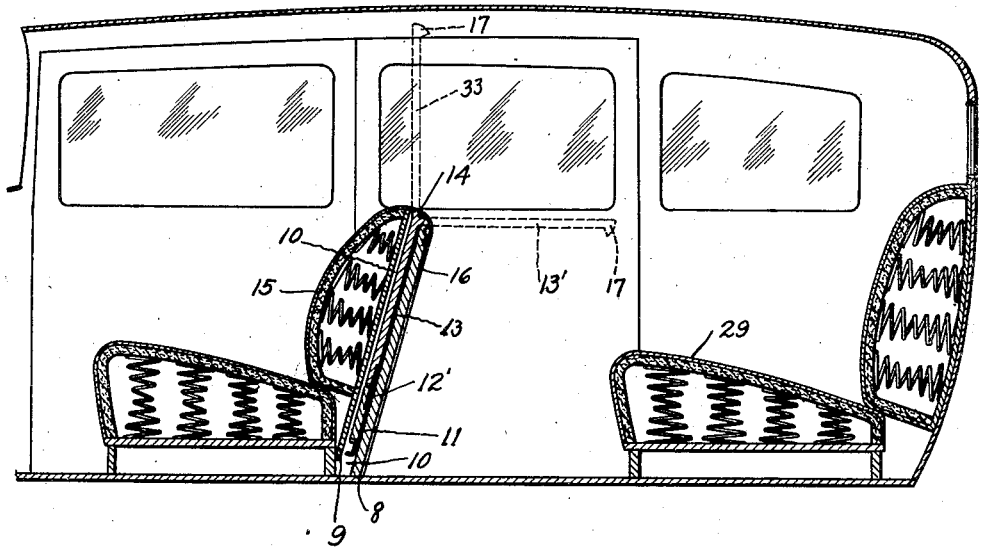
Figure 1:
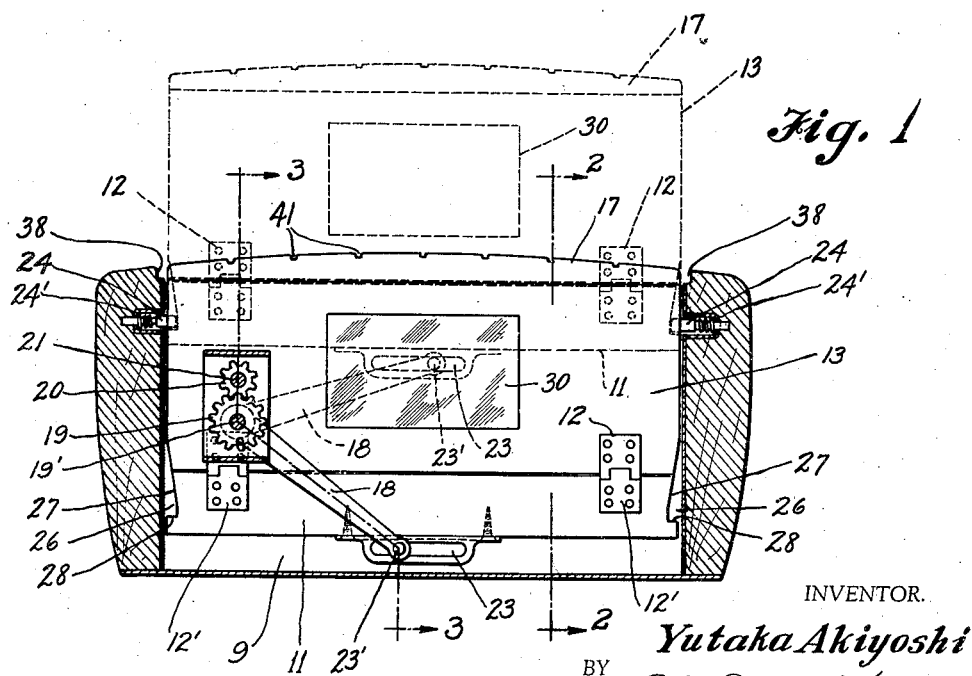

Figure 1 represents a rear view of a front seat with coverings removed to show working parts, Figure 2 is a sectional side elevation of an automobile body taken on line 2—2 of Fig. 1, and showing the table and parts, Figure 3 represents a view of the front seat taken on lines 3—3 of Figure 1, Figure 4 represents an enlarged detail in section of connected edges of upholstery, for concealing the working parts, Figure 5 represents an enlarged fragmentary view, in section, of the hinged connected edges of the table and board, Figure 6 represents a rear view of the front seat with upholstery connected above the well, and Figure 7 represents a top plan of Figure 6.

Like numerals on the different figures represent like parts.

Numeral 8 represents the rear section of any upstanding front auto seat, and 9 the front section thereof. Between these sections is provided a recess or well 10 opening from the top and extending down along the principal portion of the seat, to near each end thereof. A control or holding board 11 is slidably mounted in the well, and attached by hinges 12 to a leaf or table 13. The board and table are normally dropped or drawn into the well and concealed by a rear flap 14 of the ordinary upholstery 15, continued from the front or spring portion of the seat. This flap is adjustably connected near the upper edge of the upholstery 16 on the back of the seat. A flange 17 on the upper edge of the table extends back over the rear section 8 to provide a smoother foundation for the flap 14.

The board carries mounted on the back thereof a lifting and lowering lever 18, attached to a turnable mounted gear wheel 19 on shaft 19'. Gear 19 meshes in a power pinion 20 fixed on a spindle 21. The pinion is operated manually by a small handle 22 affixed on the spindle behind the seat. Attached on the lower edge of the board is any plate provided with a guide slot 23. A wrist pin 23' is affixed to the outer end of the lever and slidably mounted through the slot, for elevating or lowering board and table, as the handle 22 is rotated.

Plungers 24—24 are resiliently mounted in sockets 24' near the upper ends of the well, and are normally compressed against the ends of the table to retard vibration or rattle from the table while travelling. Any rubber straps or soft lining as 25 shown in Figure 5 on the inner sides of the well, further eliminate all such vibration or noise.

These plungers serve another important function for preventing the board from being raised above the top of the well, as shown in Figure 1. Notches 26 are cut into the ends of the board, slightly above the lower edge thereof, with the upper sides of the notches sloping outward on an angle as 27 to the upper edge thereof. In operation, as the board is elevated, the sloping ends thereof slide along the plungers till the square bases 28 of the notches reach the plungers, the upward movement being thereby positively checked.

When the board is lowered, the plungers are forced outward by said sloping faces, till the upper table ends come between the plungers again.

When elevated fully, the bottom of the board is flush with the top of the rear section 8 of the seat, and the table may be then turned backward on its hinges to the position shown in Figure 5, and by dotted lines 13' in Fig. 3, to be thus used by persons occupying the back seat 29.

The hinges are preferably constructed as shown in Figure 5, so that the top leaf 12 contacts with the lower leaf 12' on an obtuse angle and so supports the table on a horizontal plane while the auto seat back slopes backward in the usual manner. The top of the rear section 8 of the seat also tends to support the table firmly.

The hinge leaves are pivotally connected in the usual manner by a pivot pin 12a to permit movement, but bind sufficiently tight on the pin to prevent the weight of the table alone from causing movement. They thus retain the table at any desired angle when raised.

A mirror 30 is embedded in the under face or bottom side of the table, for use of passengers when the table is elevated, as shown in dotted lines 33 and 34 in Fig. 3. In order to provide for adjustment of the mirror to angles to reflect the image of the user properly as the light may come from various directions the table and board are slightly spaced apart and the front corners of their adjacent edges bevelled as at 31 and 32, thereby permitting the table to be rocked on the hinges to assume various positions indicated by dotted lines 33 and 34.

As it is generally desired to have the table inconspicuous, special provision is made for concealing the same, as by covering the well and lowered table with the upholstery of the seat. For that purpose one side of a flexible lacing member or common "Zipper" 35 is attached to the rear edge of the top fold 14 of the regular upholstery, and the other side 36 of the zipper is affixed in a groove 37 along the top of the rear section 8, and spaces or notches 38 are provided across the seat frame at each end of the well, to receive the united zipper parts when the flap 14 is drawn into closed position over the well, as shown in Figures 6 and 7. A further concealing tape or binding ribbon 39 may be stitched to the edge of the flap 14, and normally lie over the closed edges of adjoining upholstery and zipper. The ordinary small plate or handle 40 for connecting and disconnecting the zipper is provided inconspicuously.

When the table is to be used the zipper edges are released and the flap 14 folded over forward as shown in dotted lines 14' Figure 3. Notches 41 in the top edge of the table help to continue the ordinary creases 42 in the upholstery. When the table is elevated, it also provides a partition or shield to form a convenient private dressing room between the seats of the auto, for use when on camping trips, or for dressing purposes as at bathing beaches, etc. Ordinary curtains may be used over the windows at each side and rear of the tonneau.

It will be understood that such combination table and mirror and coverings may be adapted to seat backs, in airplanes and the like.

Having described my invention, I claim as new for Letters Patent.

1. The combination with an automobile having the rear wall of the forward seat extending rearwardly upwardly and formed with a well opening through the top of such wall, of an element movable in said well and having a vertical dimension corresponding to the depth of the well and a width corresponding to the width of the seat, said element including an upper section, a lower section, and friction hinges uniting the sections, means for raising the element relative to the well, automatically acting means to limit the raising movement of the element to position the juncture of the sections substantially in line with the top of the well, the upper section corresponding substantially in dimensions to the dimensions of the space between the top of the well and the top of the automobile and between the sides of the automobile, the meeting edges of the sections and the front and rear edges of the well being cut away to permit the upper section when the element is raised to be moved into a directly vertical plane for service as a partition or into a rearwardly extending plane for use as a table.

2. A construction as defined in claim 1, including a mirror secured to one face of the upper section, said cutting edges and friction hinges permitting the upper section when raised to be tilted through a comparatively large range of adjustment for convenient use of the mirror without interfering with the use of such section as a partition between the forward and rear compartments of the automobile.

YUTAKA AKIYOSHI.